No. 816,042. PATENTED MAR. 27, 1906.
C. E. SARGENT.
GAS CALORIMETER.
APPLICATION FILED SEPT. 8, 1905.
2 SHEETS—SHEET 2.
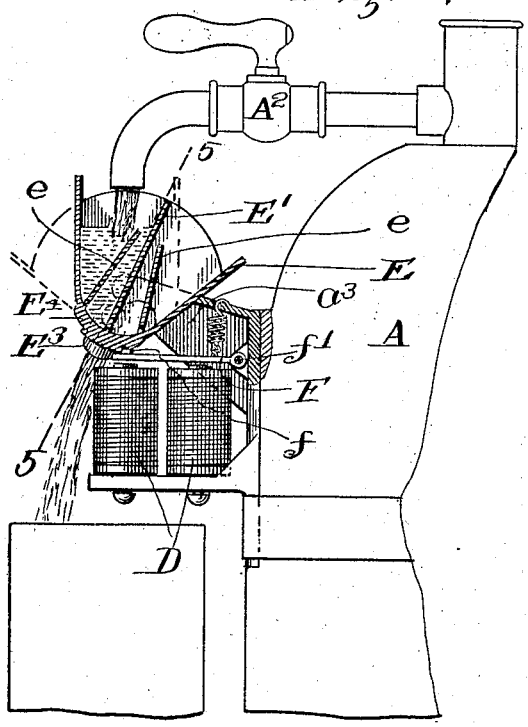
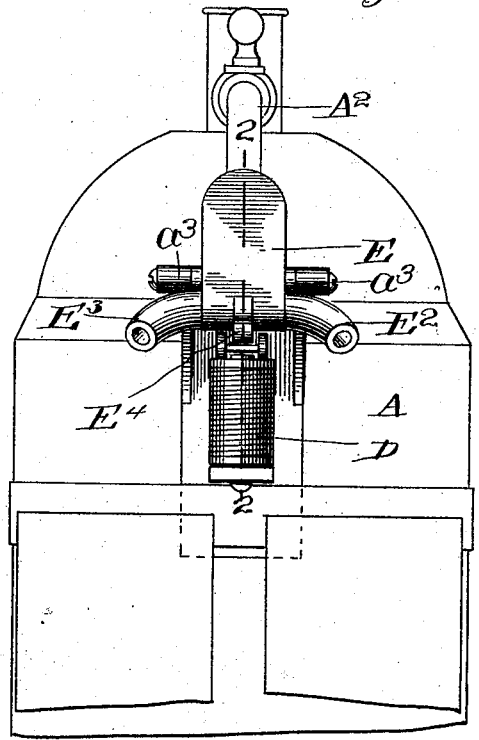
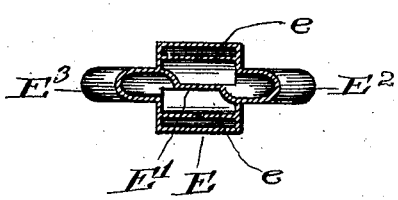
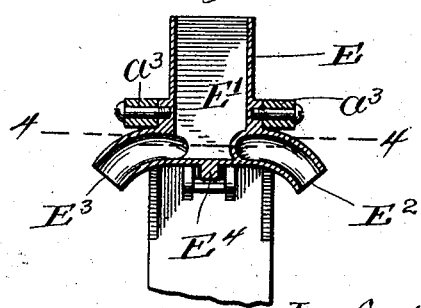

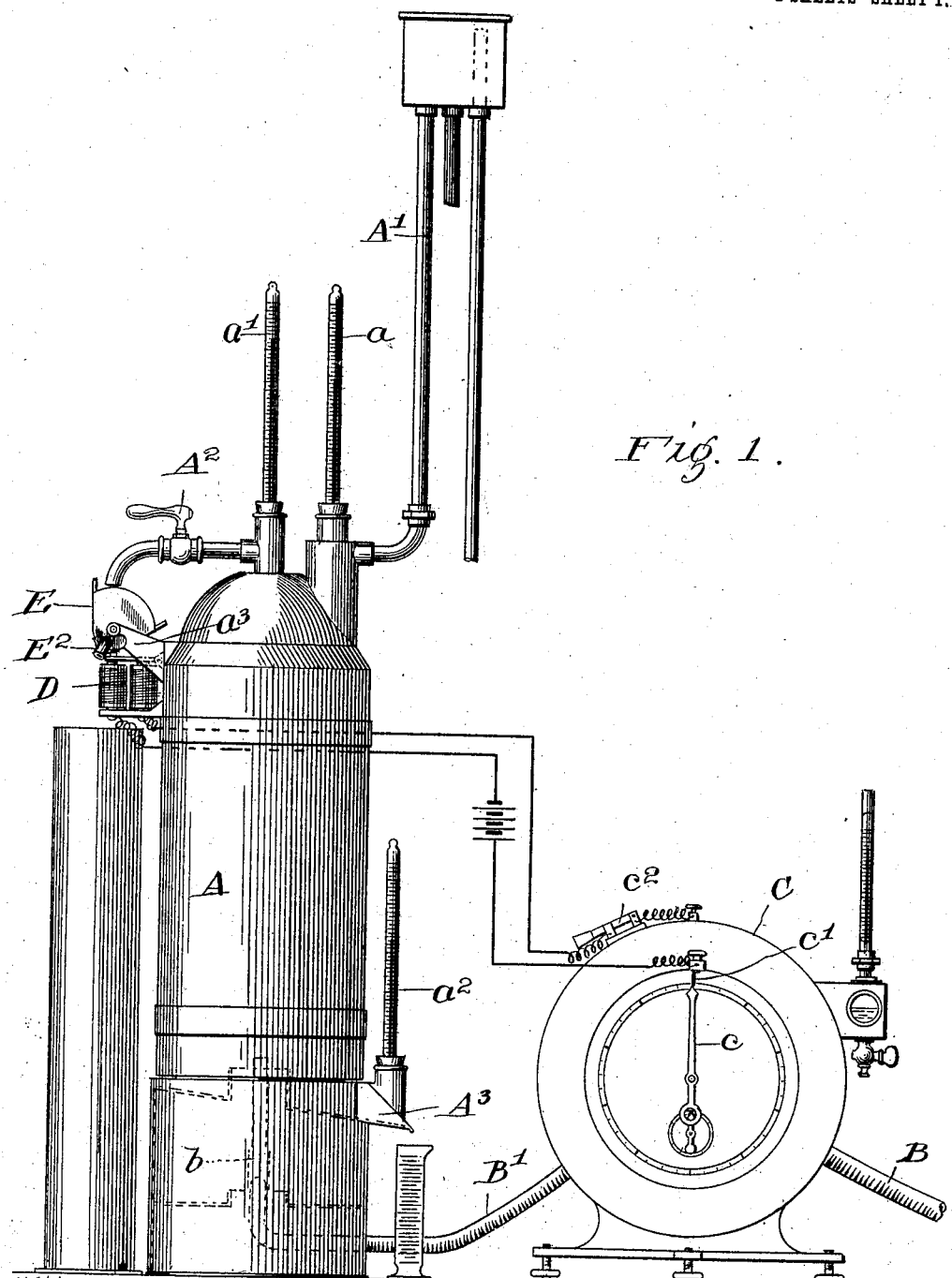

UNITED STATES PATENT OFFICE.

CHARLES E. SARGENT, OF CHICAGO, ILLINOIS.

GAS-CALORIMETER.

No. 816,042.      Specification of Letters Patent.      Patented March 27, 1906.

Application filed September 8, 1905. Serial No. 277,572.

*To all whom it may concern:*

Be it known that I, CHARLES E. SARGENT, a citizen of the United States of America, residing at Chicago, in the county of Cook and State of Illinois, have invented certain new and useful Improvements in Gas-Calorimeters, of which the following is a specification.

My invention relates to improvements in gas-calorimeters, and is fully described and explained in this specification and shown in the accompanying drawings, in which—

Figure 1 is a side elevation of my improved device. Fig. 2 is a section in the line 2 2 of Fig. 3. Fig. 3 is a detailed front elevation of certain portions of my improved device. Fig. 4 is a section in the line 4 4 of Fig. 5, and Fig. 5 is a section in the line 5 5 of Fig. 2.

Referring to the drawings, A is the heater of my improved calorimeter, the same being of any ordinary form. The heater is supplied with water at a constant head by a feed-pipe A' and has an outlet-faucet $A^2$ extending forward. The temperature of the water entering the heater A is shown by a thermometer $a$, and the temperature of the water leaving the heater is shown by a thermometer $a'$. The gas to be tested comes in from a pipe B, passes through a meter C, thence through a pipe B' to a burner $b$. The water of condensation from the gas runs out at $A^3$, its temperature is measured by a thermometer $a^2$, and its quantity is measured in an ordinary glass graduate. The amount of this liquid is small and can be taken care of in this way; but this factor must be taken into account to obtain accurate readings.

The meter C has a needle $c$, which periodically comes in contact with an insulated contact-piece $c'$ to close an electric circuit controlled by a switch $c^2$ and containing an electromagnet D.

The water flowing from the outlet-faucet $A^2$ enters a trough E, pivoted below its center of gravity between ears $a^3$ on the heater-body. This trough is divided longitudinally by a partition E' into two portions, one of which is connected to a spout $E^2$ and the other of which is connected to a spout $E^3$, said spouts being at opposite ends of the trough. It will thus be seen that water in one of the portions of the trough will flow out at one end, while water in the other portion will flow out at the opposite end. Each of the trough portions is partially divided by a partition $e$, perforated at its lower end, the position and arrangement of this portion being clearly illustrated in Fig. 2. The trough E has on its bottom a stop $E^4$, which is adapted to be engaged upon either side by a pin $f$ on an armature F, pivoted at $f'$, said armature being in position to be operated by the electromagnet D referred to.

It will be seen that when the device is at rest and no water is passing through it the trough will lie on one side or the other of the vertical line passing through its pivot, and at such times the stop $E^4$ will be engaged by the pin on the armature to hold the trough in this position, which may be the position illustrated in solid lines in Fig. 2. Assuming now that it is desired to operate the apparatus, the gas is turned on, the flame lighted, and water is permitted to flow through the heater. The water on passing out from the heater will enter the uppermost trough-section and from there will flow out of one of the spouts $E^2$ $E^3$ into a suitable reservoir provided for the purpose. In starting the apparatus the switch $c^2$ will probably be opened, so that the water will flow in this way until the difference in temperature between the water entering and leaving the heater has reached a constant—*i. e.*, until the metal parts of the heater are warmed up sufficiently to remove any error due to what may be called "caloric inertia." Thereupon the switch $c^2$ will be closed, and thereafter the first time the hand $c$ of the meter passes the contact $c'$ the electric circuit will be completed, the magnet D energized, and the armature F attracted, thus drawing the pin $f$ out of the path of the stop $E^4$. At this time it will be seen the uppermost portion of the trough is full of water, and consequently much heavier than the other, and the moment the pin on the armature is removed this section will move downward, causing the water from the heater to enter the other section, which has up to this time been idle. As soon as the needle has passed the contact $c'$ the magnet will be deënergized and the armature will return to place, locking the trough in its new position. To hold the trough during the appreciable length of time that the needle is passing the contact and the trough consequently is free to move in either direction is the function of the partial partitions $e$. These partitions cause the water to flow out slowly and hold it in the highest portion of the trough and those portions farthest removed laterally from the trough-pivot. Thus when the trough swings from the position shown in solid lines to the position shown in dotted lines in Fig. 2 the water in the left-hand trough-section flows out slowly and until it has flowed out it is held in the upper and forward portion of the trough, and consequently exerts the greatest tilting effect possible on the trough. This body of water holds the trough in its new position until the water has decreased and the water in the other section has increased sufficiently to balance each other. This occupies quite a considerable length of time, and in the meanwhile the armature has returned to position, so that the trough is locked. It will be seen that the partitions $e$ are sufficiently low that the normal flow of water passes over them. It is thus only immediately after the change in position of the trough that these partitions are of utility, and they then perform the very valuable function of detaining a portion of the water to act as a weight for a considerable period of time. It will be seen that when the trough is tilted, as above set forth, the water from the heater flows through the other section and out at the other end of the trough into a different reservoir. If it is desired only to measure the heating capacity of the gas passing through the meter during a single revolution of the needle, nothing more need be done, for when the needle completes its rotation it will again close the electric circuit and cause the flow to enter the first trough-section, and consequently be cut off from the receiving-reservoir. In this way one reservoir will catch the water passing through and heated in a single revolution of the needle and no more or less. Heretofore it has been customary to note the time when the needle passes a given point in the dial and then cut off the water-flow by hand or some other method equally affected by the personal equation of the operator has been adopted. With my device the personal equation is practically eliminated except in the reading of the thermometers, for the calorimeter itself deposits in a given receptacle the water which passes through it during the time when the burner is using a given volume of gas. If it is desired to make a longer reading than that of a single turn of the meter-needle, the switch $c^2$ can be opened shortly after the trough is shifted in one direction and can be closed after any given number of turns of the needle. Then when the switch is closed no result will take place until the needle completes a revolution, and the water in the reservoir will be exactly the amount which passed through the apparatus during the total movement of the needle.

I realize that considerable variation is possible in the details of this construction without departing from the spirit of the invention, and I therefore do not intend to limit myself to the specific form herein shown and described.

I claim as new and desire to secure by Letters Patent—

1. The combination with a heater, a fuel-meter and a source of water-supply connected with the heater, of a device for directing the flow of water to a reservoir and deflecting it therefrom, and means governed by the meter for controlling said device.

2. The combination with a heater, a fuel-meter and a source of water-supply connected with the heater, of a water-receptacle arranged to receive the flow from the heater and means under the control of the meter for directing the flow from said receptacle to a reservoir and deflecting it therefrom.

3. The combination with a heater, a fuel-meter and a source of water-supply connected with the heater, of a water-directing device which can occupy two positions said device being constructed and arranged to direct water in a different direction in each of its positions and means under the control of the meter for determining the position of said water-directing device.

4. The combination with a heater, a fuel-meter and a source of water-supply connected with the heater, of a pivoted water-receiving device which can occupy two positions and which is constructed and arranged to direct water in a different direction in each of its positions and which is constructed and arranged to move from one position to the other under the influence of the water and a stop for holding the receiving device against the influence of the water, and means governed by the meter for withdrawing the stop to permit the receiving device to move.

5. The combination with a heater, a fuel-meter and a source of water-supply connected with the heater, of a pivoted water-deflecting device capable of occupying two positions and constructed and arranged to move under the influence of the water which it contains at any given time, means under the control of the meter for preventing movement of the water-deflecting device except at certain times, and a device of retarding the movement of the water from the water-deflecting device after its movement.

6. The combination with a heater, a fuel-meter and a source of water-supply connected with the heater, of a pivoted water-deflecting device capable of occupying two positions and operating to cause water to flow in a different direction in each position and to be moved from one position to the other under the influence of the water it contains, a stop arranged to prevent movement of the water-deflecting device, an electromagnet arranged to withdraw the stop and an electric circuit including said magnet and controlled by the meter.

7. The combination with a heater, a fuel-meter and a source of water-supply connected with the heater, of a pivoted trough divided into two portions and having a different opening from each portion, said trough being arranged to receive water from the heater in the portion which is uppermost at any given time and a stop controlled by the meter and engaging with the trough.

8. The combination with a heater, a fuel-meter and a source of water-supply connected with the heater, of a trough divided into two portions each of which has a separate opening, said trough being pivoted below its center in position to receive the water from said heater, a stop on said trough, and means of connection between the stop and the meter.

9. The combination with a heater, a fuel-meter and a source of water-supply connected with a heater, of a trough divided into two portions each of which has a separate opening, said trough being pivoted below its center in position to receive the water from said heater, a stop on said trough, and means of connection between the stop and the meter, and a partial partition in each trough-section arranged to hold a portion of the water in each section after the trough has shifted.

In witness whereof I have signed the above application for Letters Patent at Chicago, in the county of Cook and State of Illinois, this 29th day of August, A. D. 1905.

CHARLES E. SARGENT.

Witnesses:
CHAS. O. SHERVEY,
KATHLEEN CORNWALL.